United States Patent Office 2,937,198
Patented May 17, 1960

2,937,198

2-METHYL-2,4-PENTANEDIOL BIS(P-CHLOROBENZOATE)

David A. Gordon, Midland, Mich., assignor to The Dow Chemical Company, Midland, Mich., a corporation of Delaware No Drawing. Application May 19, 1958
Serial No. 735,981

1 Claim. (Cl. 260—476)

This invention is directed to the novel compound 2-methyl-2,4-pentanediol bis (p-chlorobenzoate) and to a method for its preparation. The present compound corresponds to the formula.

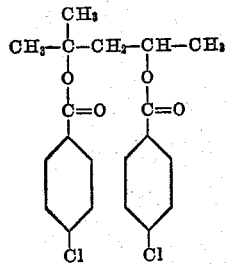

The new ester is a crystalline solid, soluble in many common organic solvents, such as methanol and acetone. The compound of the present invention is useful as a parasiticide and is especially adapted to be employed in the control of insects.

The novel compound is prepared by reacting 2-methyl-2,4-pentanediol and p-chlorobenzoyl chloride. The reaction is carried out in the presence of a hydrogen chloride acceptor. Hydrogen chloride of reaction is formed and appears in the reaction mixture as the corresponding salt of the hydrogen chloride acceptor which may be a tertiary amine. Good results are obtained when employing two molecular proportions of p-chlorobenzoyl chloride and slightly more than two molecular proportions of hydrogen chloride acceptor for each mole of 2-methyl-2,4-pentanediol. The reaction is exothermic and is carried out in the temperature range of from 0° to 80° C. The temperature of the reaction mixture may be controlled by regulating the rate of contacting of reactants, or by external cooling, or both.

In carrying out the reaction, the p-chlorobenzoyl chloride reactant is added slowly and with stirring to a mixture of the 2-methyl-2,4-pentanediol, hydrogen chloride acceptor which may be a tertiary amine such as pyridine, and, if desired, an inert liquid reaction medium which may be diethyl ether, benzene, or the like. Stirring is thereafter continued for at least part of the additional time necessary to complete the reaction. Upon completion of the reaction, the desired product may be separated and purified in known ways such as by solvent extraction together with washing of the solvent solution, recrystallization, and the like.

The following example illustrates the invention but is not to be considered as limiting.

*Example 1* p-Chlorobenzoyl chloride (2.0 moles; 352 grams) was added slowly and with stirring to one mole (118 grams) 2-methyl-2, 4-pentanediol and 2.2 moles pyridine. The addition was carried out over a period of 5 hours with the reaction mixture chilled over an ice bath to temperatures in the range of from 2° to 10° C. Stirring was thereafter continued for an additional 3 hours. Then 300 milliliters of diethyl ether was added and thoroughly stirred to dissolve ether-soluble components of the reaction mixture. The resulting solution was allowed to stand for approximately 60 hours and then diluted with further diethyl ether and washed with water. The ether layer was separated and dried over anhydrous potassium carbonate. Ether solvent was removed by vaporization leaving a white solid product residue which was recrystallized from methanol to obtain a crystalline solid 2-methyl-2,4-pentanediol bis (p-chlorobenzoate) product melting at 81°–83° C.

The present compound is useful as an insecticide. For such use, the compound may be dispersed on an inert, finely divided solid and the resulting preparations employed as a dust. Also, such preparations may be dispersed in water with or without the aid of a wetting agent and the resulting aqueous suspensions employed as sprays. In other procedures, the compound may be employed in a solvent such as oil or as a constituent of solvent-in-water or water-in-solvent emulsions or as aqueous dispersions thereof which may be applied by spray, drench or wash. In a representative operation, a thorough wetting application of an aqueous dispersion containing one pound of the present compound per 100 gallons of ultimate composition to young cranberry bean plants gave a virtually complete kill of a population of southern army worm larvae feeding thereon, without evident injury to the bean plants.

I claim:
2-methyl-2,4-pentanediol bis(p-chlorobenzoate).

References Cited in the file of this patent

UNITED STATES PATENTS

| | | |
|---|---|---|
| 1,700,656 | Emerson et al. | Jan. 25, 1955 |
| 2,773,895 | Ballard et al. | Dec. 11, 1956 |

OTHER REFERENCES

Heim et al.; J. Org. Chem. 9, 300 (1944)